(12) United States Patent
Stahel et al.

(10) Patent No.: US 7,287,773 B1
(45) Date of Patent: Oct. 30, 2007

(54) FOLDING FLOOR BOARDS

(75) Inventors: Alwin J. Stahel, St. Paul, MN (US); Brian K. Stahel, New Brighton, MN (US)

(73) Assignee: Kuryakyn Holdings, Inc., Somerset, WI (US)

( * ) Notice: Subject to any disclaimer, the term of this patent is extended or adjusted under 35 U.S.C. 154(b) by 231 days.

(21) Appl. No.: 11/105,654

(22) Filed: Apr. 14, 2005

(51) Int. Cl.
*B62J 25/00* (2006.01)

(52) U.S. Cl. .................................. 280/291; 280/288.4

(58) Field of Classification Search ............. 280/288.4, 280/304.4, 291; 74/564
See application file for complete search history.

(56) References Cited

U.S. PATENT DOCUMENTS

| | | | | |
|---|---|---|---|---|
| 4,174,852 A | | 11/1979 | Panzica et al. ............. | 280/291 |
| 4,802,684 A | | 2/1989 | Bennett et al. ............. | 280/291 |
| 5,779,254 A | * | 7/1998 | James et al. ................ | 280/291 |
| 6,481,080 B2 | | 11/2002 | Monson ..................... | 29/401.1 |
| 6,688,628 B2 | | 2/2004 | Burkett ........................ | 280/291 |
| 6,719,316 B1 | * | 4/2004 | Anthony ..................... | 280/291 |
| 6,893,038 B2 | * | 5/2005 | Egan ........................... | 280/291 |
| 7,114,739 B2 | * | 10/2006 | Colano ........................ | 280/291 |
| 2002/0093167 A1 | * | 7/2002 | Jones et al. ............ | 280/87.042 |
| 2005/0241435 A1 | | 11/2005 | Colano | |

OTHER PUBLICATIONS

Kuryakyn Holdings, Inc. 2003 Catalog, pp. 37-47, Published Feb. 2003.

* cited by examiner

*Primary Examiner*—Tony Winner
(74) *Attorney, Agent, or Firm*—Dicke, Billig & Czaja PLLC

(57) ABSTRACT

A set of motorcycle floor boards are provided in position to permit a rider of a motorcycle to place feet on the floor boards when they are generally horizontal. The floor boards are pivotally mounted so that they will pivot upwardly to a vertical retracted position and are made and mounted so they will pivot to be substantially between 80 and 90 degrees from a horizontal plane. This pivoting amount will minimize the space between outer edges of the floor boards in their vertical retracted position to in turn minimize the need for a rider to spread feet widely in order to stabilize the motorcycle when stopped.

17 Claims, 9 Drawing Sheets

FOLDING FLOOR BOARDS

BACKGROUND OF THE INVENTION

The present invention relates to folding floor boards used for supporting the feet of an operator (driver) of a motorcycle that are positioned directly below the normal position of the operator or rider of the motorcycle and which are arranged so that they will fold substantially 80° or more from the horizontal usable position. The extra amount of upward pivoting minimizes the width of the motorcycle at the lower portion of the frame and thereby makes it possible for people with short legs to more easily stabilize the motorcycle when stopped. The driver's feet do not have to be spread widely apart in order to clear the folded floor boards.

Various types of folding foot supports have been utilized with motorcycles in the past, but on large touring motorcycles, such as the present Honda Model GL1800, the upward folding of driver floor boards is restricted since folding is interfered with sections of the frame and accessories of the motorcycle. The floor boards will fold up slightly, but the outer edge protrude outwardly from the floor board hinge axis at an angle to essentially widen the portions of the motorcycle that have to be cleared when a rider is placing feet on the ground to stabilize the motorcycle. The touring motorcycles are very heavy, and if the center vertical plane of the motorcycle goes more than a few degrees from vertical, it is almost impossible to stop the motorcycle from tipping. People with short legs find it very difficult to have the feet spread widely and still contact the ground with the motorcycle frame vertical.

The position of foot supports and floor board has been shown in different locations, but again, the present folding supports for the large touring motorcycles, such as the GL1800 Honda presently being made, widen the stance of a driver seeking to stabilize the motorcycle when it is stopped, and make it difficult for short people to keep the stopped motorcycle upright.

SUMMARY OF THE INVENTION

The present invention relates to folding floor boards for large touring motorcycles, which includes a mounting for a shift lever on the left hand side of the motorcycle and clearance for a brake lever on the right hand side of the motorcycle. Brackets that attach to the motorcycle frame have pivots to permit the floor boards to be folded from a generally horizontal usable or working position for supporting the feet, to a substantially vertical retracted or folded position. The upward folding places the floor boards closely adjacent the frame of the motorcycle to minimize the width of the motorcycle where the legs of a driver straddle the floor boards.

The floor boards of the present invention are large footrest boards that mount on large touring motorcycles and provide adequate support for the feet and legs of the rider/driver. The brackets permit the floor board to be folded upwardly about a fore and aft pivot axis connection.

The floor boards are positioned directly below the location of the feet of a rider/driver of a motorcycle seated on the motorcycle seat, and are large enough for comfort. By folding the motorcycle floor boards to a generally vertical position, the width of the motorcycle is not increased excessively so that people with shorter legs can have their feet contact the ground either while seated or while standing without being spread wide due to either the non-folding or incomplete folding of the floor boards. The wide spread stance that is necessary for a driver to stabilize a stationary motorcycle with present floor boards which will not fold to be close to the motorcycle results in the motorcycle inclining at an angle that is enough to shift the center of gravity and cause the motorcycle to tip once the driver's right or left foot contacts the ground. With the present invention, by minimizing the width, even short legged people can have their feet on the ground with the motorcycle substantially vertical.

DETAILED DESCRIPTION OF THE PREFERRED EMBODIMENTS

Figure 1:
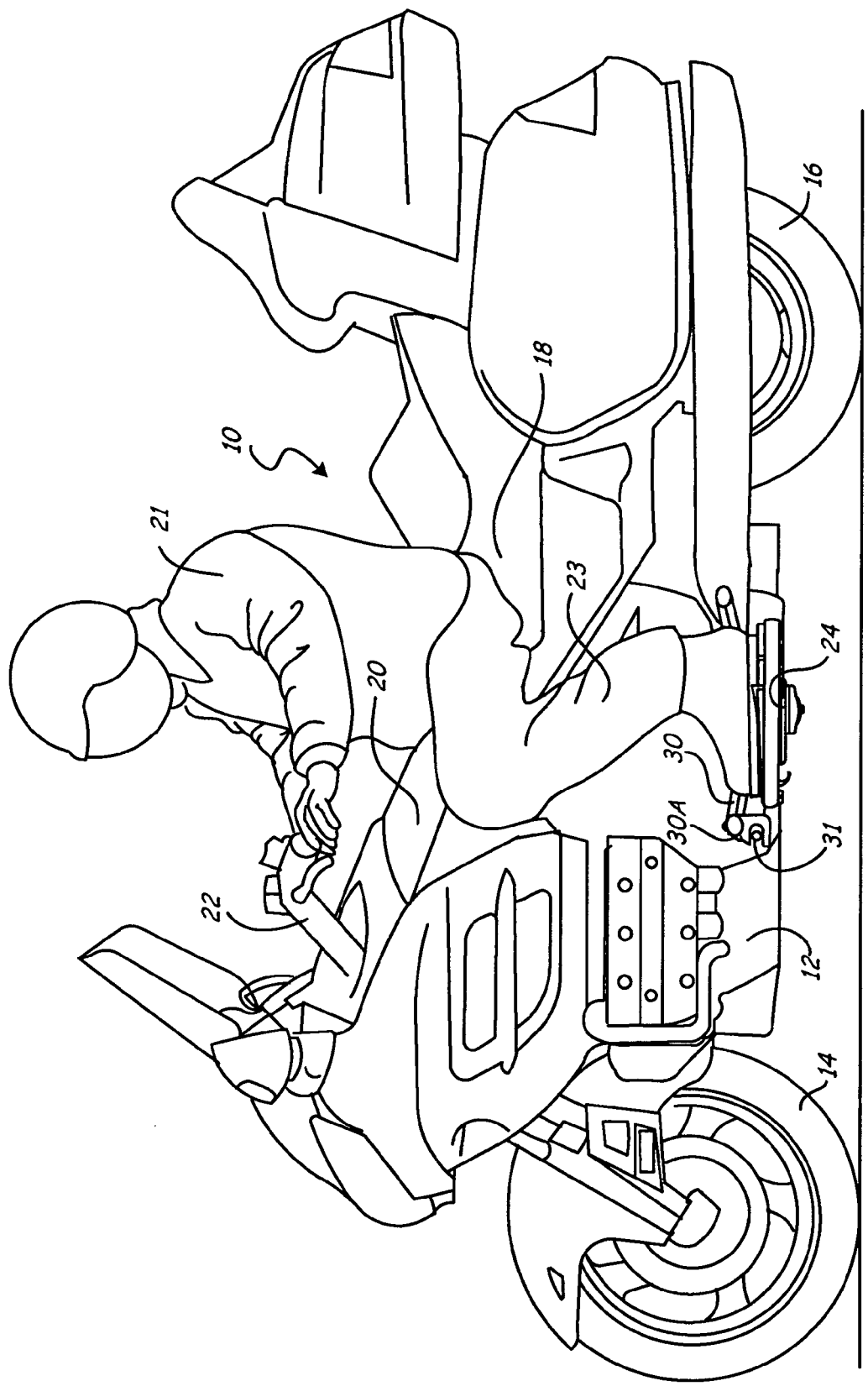
FIG. 1 is a side elevational view of motorcycle having floor boards made according to the present invention and installed thereon.
Figure 2:
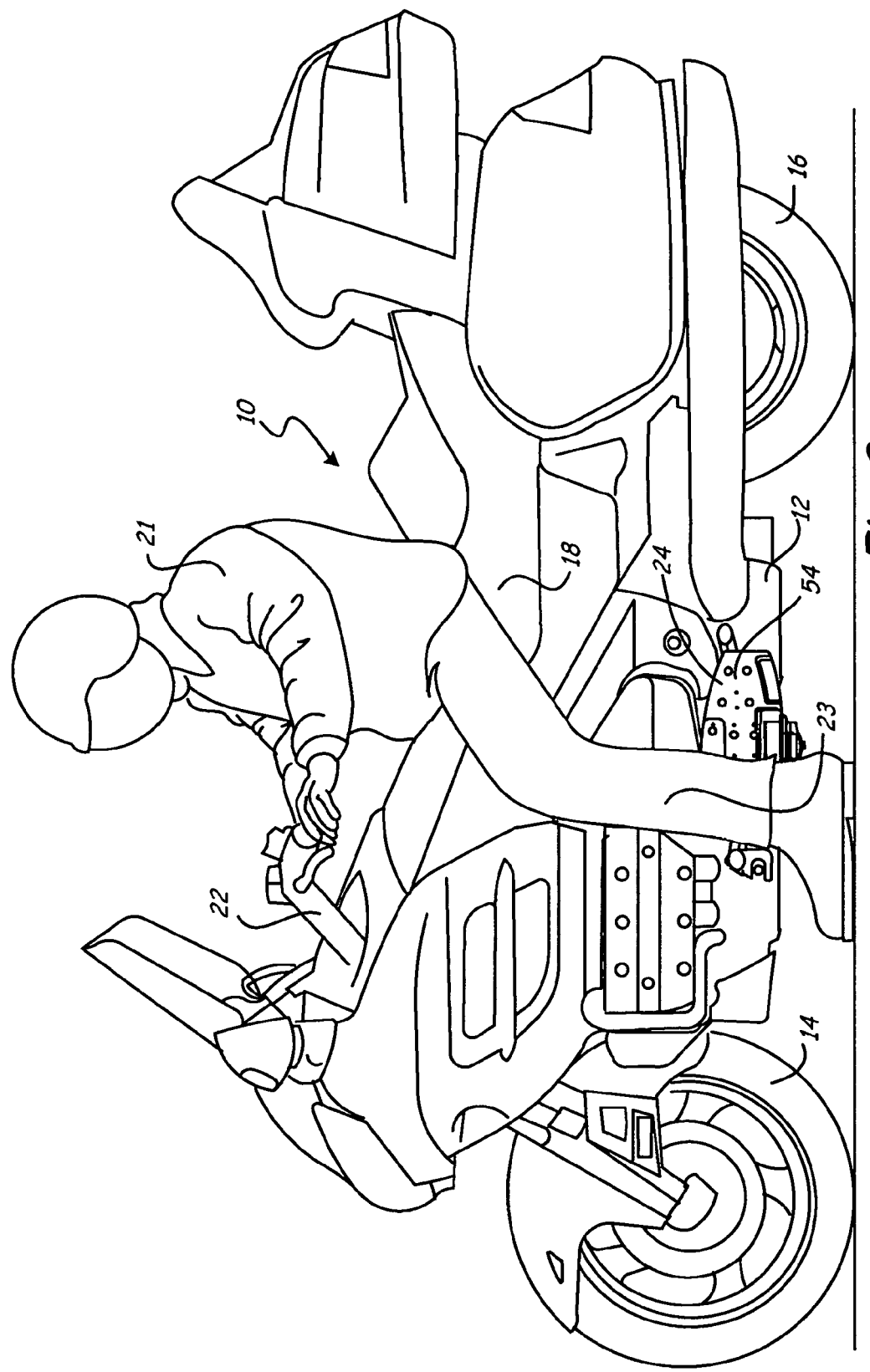
FIG. 2 is a side view of the motorcycle of FIG. 1 stopped and with the rider's feet on the ground.
Figure 3:
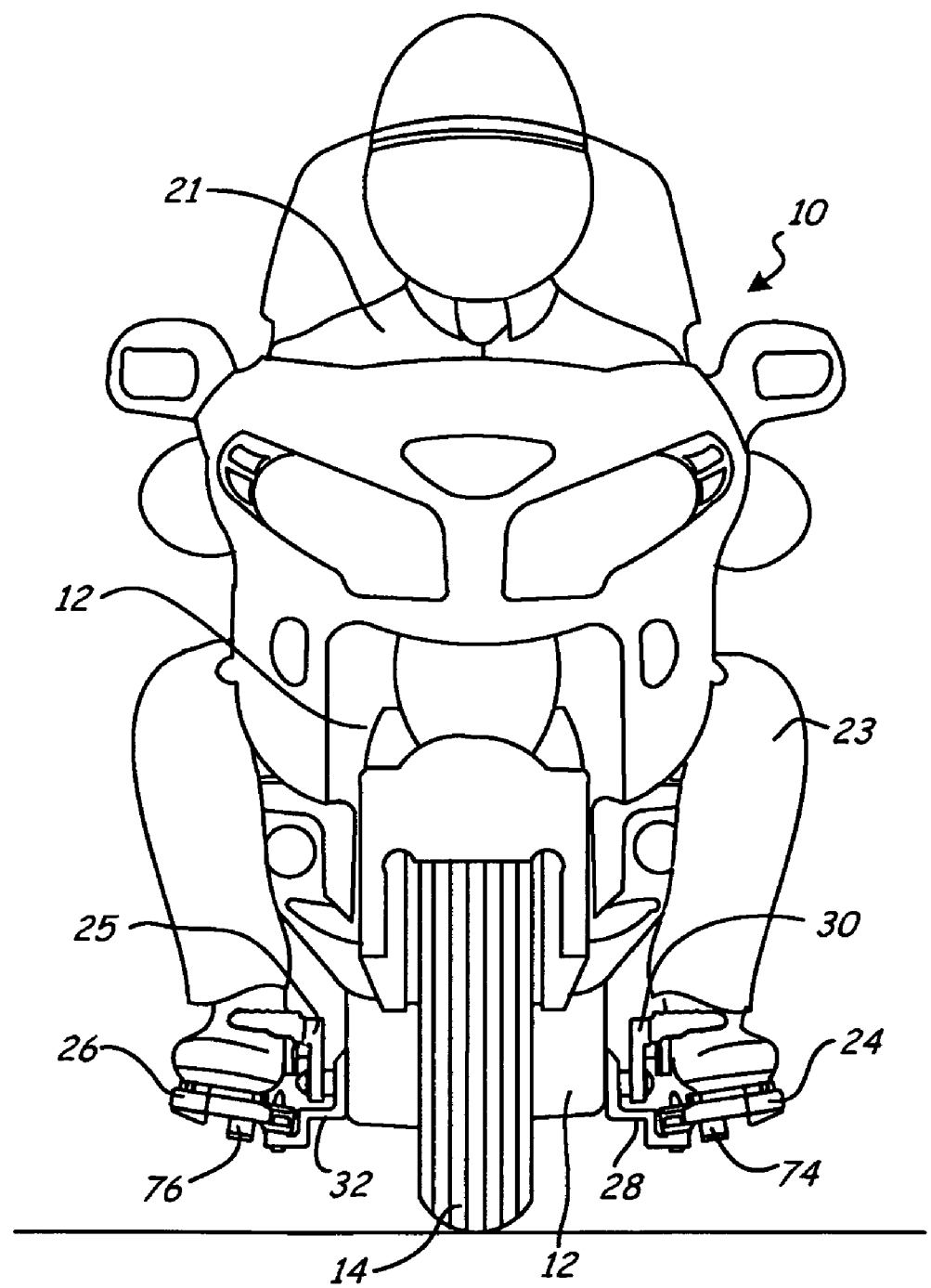
FIG. 3 is a front view of FIG. 1.
Figure 4:
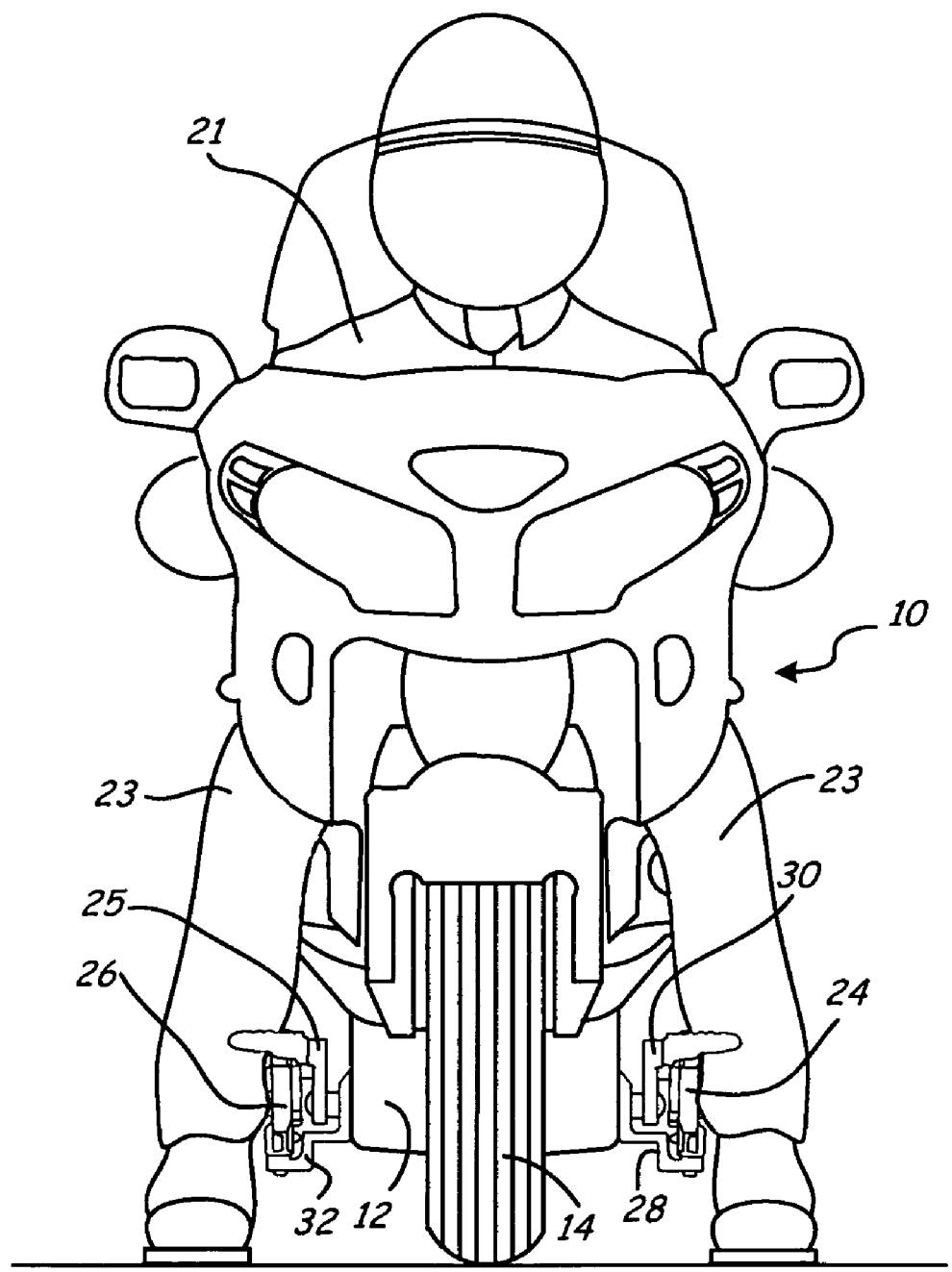
FIG. 4 is a front view of FIG. 2.
Figure 5:
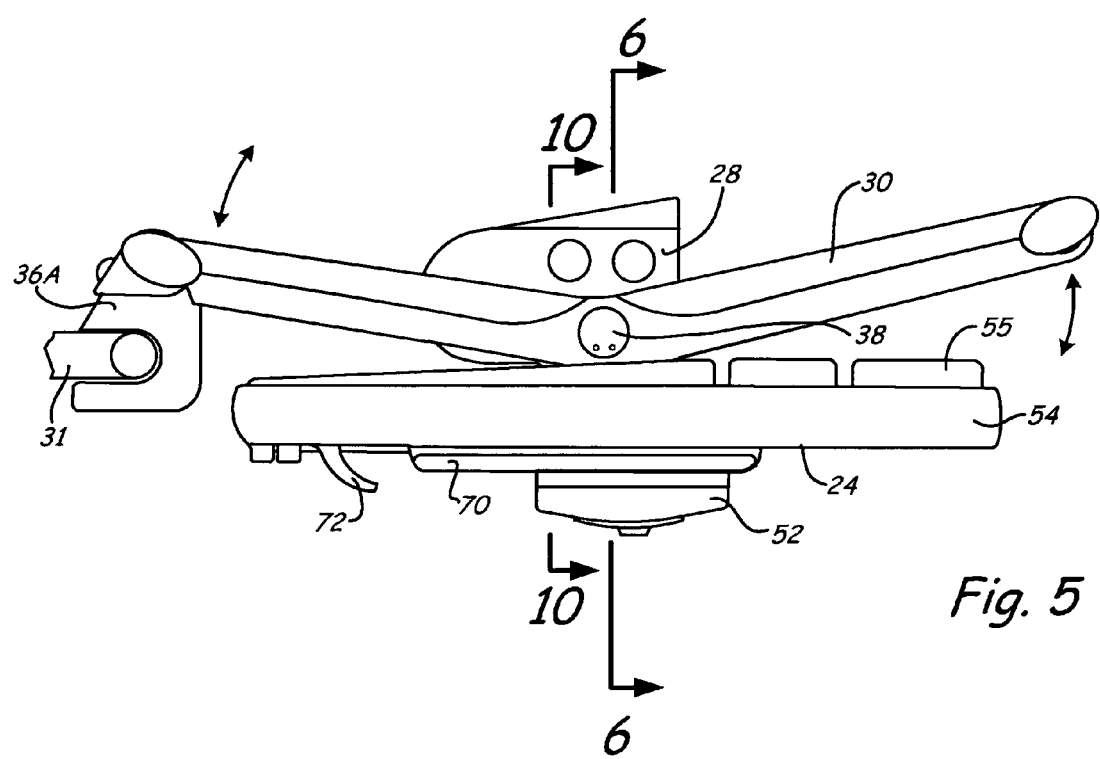
FIG. 5 is a side view of the floor board mounting of the present invention on the left side of the motorcycle.
Figure 6:
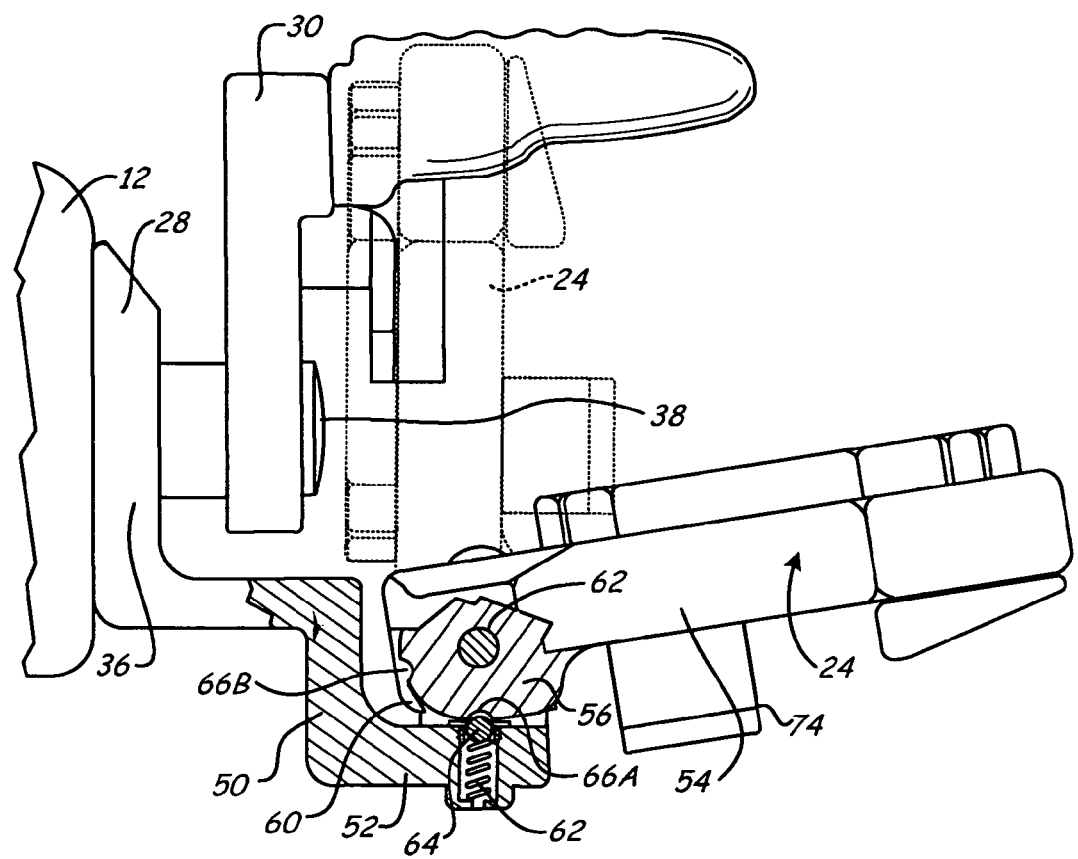
FIG. 6 is a partial sectional view taken on line 6-6 in FIG. 5.
Figure 7:
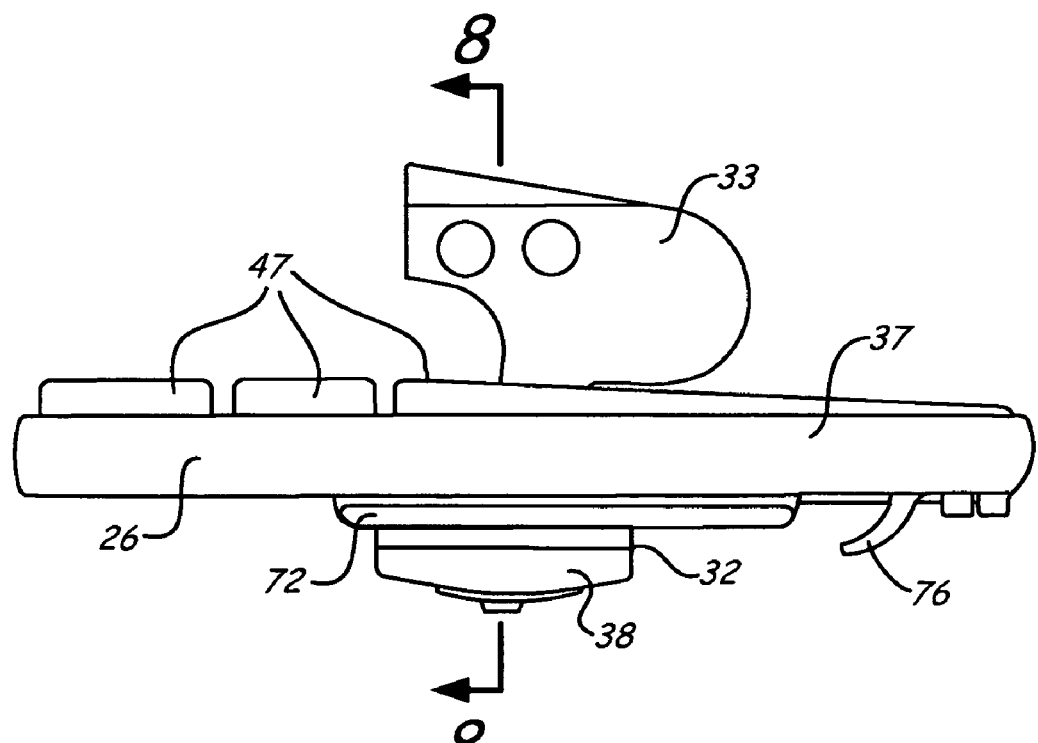
FIG. 7 is a side view of a floor board of the present invention on the right side of the motorcycle.
Figure 10:
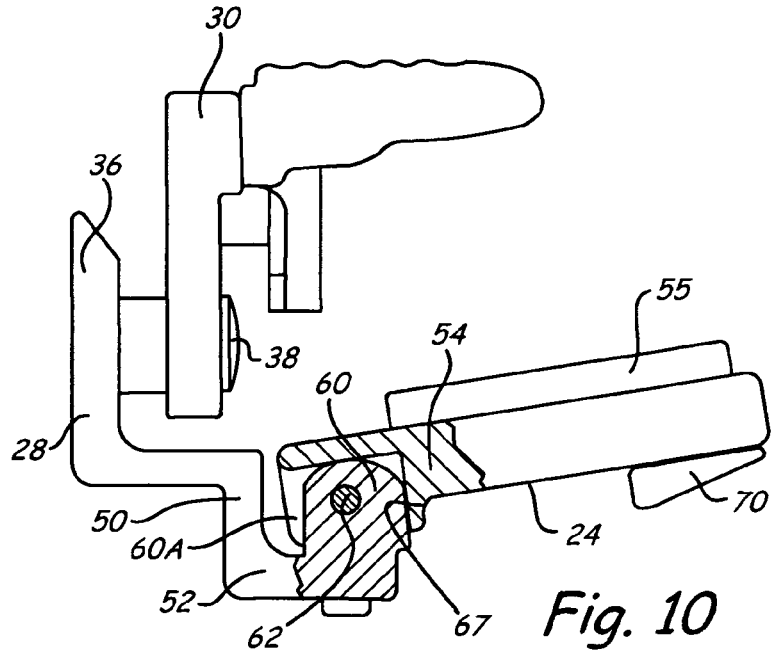
FIG. 10 is a sectional view taken on line 10-10 in FIG. 5.

In FIG. 1, a touring motorcycle indicated generally at 10, has a frame 12, and front and rear wheels 14 and 16, respectively. An operator's seat 18 is provided on the frame behind the gas tank 20. The operator's seat is positioned so that when an operator 21 is sitting and holding handle bars 22 that are used for steering the front wheel, the legs 23, when bent, will be in a position just slightly ahead of the seat. An operator's foot is shown resting on a floor board 24 on the side view of FIG. 1, which is the shift or shifter side. The floor board 24 attaches to the frame 12 with a bracket 28 (shown in FIGS. 5 and 6). A shift lever 30 is provided on the bracket 28. The bracket 28 is offset as shown in FIGS. 6 and 10 to support the floor board with clearance for the gear shift arm.

The gear shifter left side floor board bracket 28 has an upright flange 36 that bolts onto the motorcycle frame 12, and a pivot pin 38 is supported on the flange 36 and permits the shifter lever 30 to rock or pivot for shifting. The ends of the gear shifter lever 30 move up and down as the shifter is rocked. The forward end 30A has a connection to the gear shift control 31 on the motorcycle. This shifts the gears in the motorcycle transmission in a normal manner.

The right floor board 26, which is on the brake pedal side is mounted on a brake pedal bracket 32 that has a vertical flange 33 fixed to the motorcycle frame. The brake pedal arm 25 attaches to a brake control shaft on the motorcycle, the right side bracket 32 has an offset portion 48 so that the brake lever or arm 25 is positioned over the laterally extending portion with enough clearance so that the brake can be operated.

Figure 8:
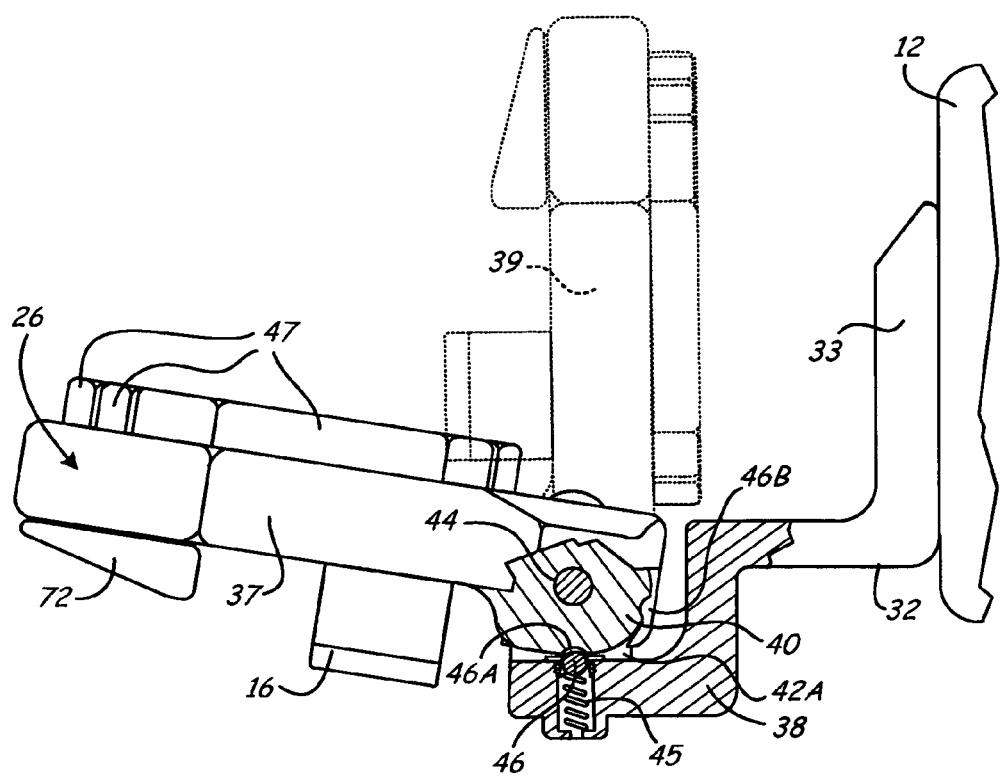
FIG. 8 is a partial sectional view taken on line 8-8 in FIG. 7.
Figure 9:
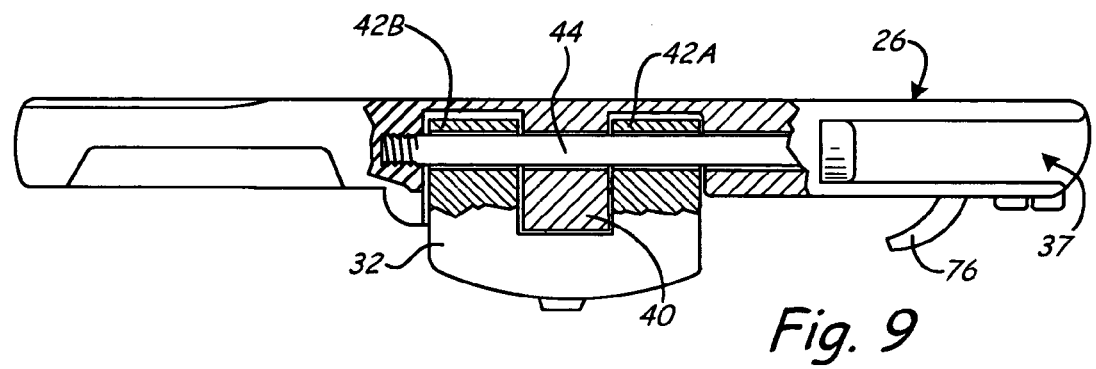
FIG. 9 is an inner side view of the right hand floor board with the mounting bracket broken away to show the pivot bolt.

The floor board 26 on the right side of the motorcycle is pivotally mounted to a bottom support flange 37 of the bracket 32. The floor board 24 has a support plate or frame 32 that has a hub 40 on one edge. The bottom support flange 38 of bracket 32 has spaced hubs 42A and 42B that receive hub 40 between them. A pivot pin 44 is used for pivotally mounting the floor board 26 onto the bottom support flange 38 of bracket 32, as shown in FIGS. 8 and 9. The bottom support flange 38 has a bore containing a detent spring 45 and a detent ball 46 that is spring loaded outwardly to engage one of a pair of detent recesses 46A and 46B in the hub 40 of the floor board.

As can be seen in FIG. 8, the floor board 26 pivots from a solid line and stopped position, where it is generally horizontal so that a foot can be placed on the pads 47 on the top of the floor board 26, to a retracted or folded position where the floor board plane is essentially vertical. The retracted floor board 26 is at a vertical position to take up a minimum lateral space from the side of the motorcycle frame in its upwardly folded position.

The bracket 28 on the left side of the motorcycle has an offset section 50 that supports a bottom support flange 52. The floor board 24 has a support plate or frame 54 that has top pads 55. The support plate 54 has a hub 56 at one side, and the hub 56 fits between a pair of spaced hubs 60 on the bottom support flange 52 positioned in the same relative local as hubs 42A and 42B in FIG. 9. A pivot pin 62 is used to pivotally join the hub 56 to hubs 60 (one of which is shown in FIG. 6) for pivotally mounting the floor board 24 so that it can be moved from a horizontal working position shown in solid lines to a full vertical retracted or folded position shown in dotted lines in FIG. 6. The floor board 26 is at a minimum spacing from the side of the motorcycle in its retracted position. The bottom support flange 52 has a bore with a spring 62 and detent ball 64. The detent ball 64 will engage one of a pair of recesses 66A and 66B in the hub 56 to detent the floor board 24 in its working and retracted positions. The movement downward of the floor board to its horizontal position is positively stopped as shown in FIG. 10 with a stop surface 67 on one side of recesses in the respective plate 54 (or 37) found to receive the hubs 60 (or 42A, 42B). The stop surface will positively engage a side of the hub 60 (or 42A and 42B) to stop the floor board from pivoting so it is positively positioned in the working horizontal position.

As shown, the floor board 24 on the left side of the motorcycle has a skid plate or member 70 that may engage the ground on sharp turns giving an audible warning as well as protecting the base plate of the floor board. The floor board 26 also has a skid plate or member 72 at the outer side thereof for the same purposes. The member 70 and 72 can be made to be replaceable if desired. Additionally, the floor board 24 has a clip or projection 74 that is used for returning the floor board to its useable horizontal position with a side foot from its vertical position. The clip 74 will stick outwardly from the bottom of the floor board frame or plate and the foot of the operator can be used for pivoting the floor board back to its working position. The floor board 26 has a clip 76 for the same purpose.

The floor boards pivot from a generally horizontal position to a position that is between 80 and 90 degrees upwardly relative to a horizontal plane. The full vertical or near vertical folding of the floor boards permits mounting them in a location aligned with the normal positioning of the legs of the driver as the driver stands (or sits with the feet on the ground) so the motorcycle can be stabilized when it is not moving. The floor boards do not interfere with a drive standing or sitting with the feet on the ground.

Although the present invention has been described with reference to preferred embodiments, workers skilled in the art will recognize that changes may be made in form and detail without departing from the spirit and scope of the invention.

What is claimed is:

1. A set of floor boards for a driver of a motorcycle, said floor boards comprising a left floor board and a right floor board, support brackets for mounting each of the floor boards on the right and left sides of the motorcycle, respectively, a pivotal mounting between a generally horizontal portion of the respective support brackets and the respective floor board, wherein said floor boards pivot from a generally horizontal position to a position that is between 80 and 90 degrees upwardly relative to a horizontal plane to minimize the spacing between upper edges of the floor boards when in a retracted position to permit a driver's legs to be positioned close to sides of a stationary motorcycle, wherein said support brackets include flanges that attach to a motorcycle frame, and an outwardly extending offset section for clearance for foot operated controls, and the horizontal portions of the support brackets comprising support flanges for forming a pivot support for the floor boards, and wherein the right floor board bracket offset section is of size to provide clearance for a brake lever to be positioned between the floor board and the motorcycle frame, and on an upper side of the offset portion of the bracket.

2. The set of floor boards of claim 1, wherein the floor boards have generally flat planar plates pivotally mounted to the horizontal portion of the support brackets.

3. The set of floor boards of claim 2, wherein said planar plates have clips protruding from the bottom side thereof for aiding in manipulating the floor boards to pivot from the retracted position to the generally horizontal position.

4. The set of floor boards of claim 1, wherein said left floor board support bracket has a pivot pin that extends generally horizontally and laterally which pivotally mounts a gear shift operator.

5. The set of floor boards of claim 1, wherein each of the floor boards has a skid plate on a lower side thereof adjacent an outer edge thereof.

6. The set of floor boards of claim 1, wherein each of the floor boards has detents for detenting each floor board in a retracted position and in a horizontal position.

7. The set of floor boards of claim 1, wherein said floor boards and brackets have engaging stop surfaces to stop downward movement when the floor boards are in the respective generally horizontal position.

8. The set of floor boards of claim 1, wherein said floor boards are substantially aligned in a vertical direction with lower legs of a driver seated on the seat of the motorcycle.

9. The set of floor boards of claim 1, wherein one of the respective floor boards and its associated support bracket has a pair of spaced hubs, and the other of the respective floor board and its support bracket has a single hub that fits between the spaced hubs, and a pivot pin for pivotally mounting the spaced hubs and single hub together.

10. The set of floor boards of claim 9 wherein the support brackets are configured to position the pivot pins to permit the floor boards to pivot substantially 90° from the generally horizontal position.

11. A fully folding floor board for a driver of a motorcycle, a support bracket for mounting the floor board on the motorcycle, the floor board having a plate portion, a pivot connection between the support bracket and the floor board, the floor board being movable from a generally horizontal position to a position that is substantially vertical and the bracket being configured to permit the floor board to pivot the vertical position by clearing the side of the motorcycle to minimize the spacing between an upper edge of the floor board when in the vertical position to permit a driver's legs to be close to the side of the motorcycle when the motorcycle is stationary, wherein the support bracket has a vertical mounting flange, a horizontal offset portion, and a floor board support portion, the vertical mounting flange having a horizontal pivot thereon, and a shift arm pivotally mounted on the horizontal pivot.

12. The floor board of claim 11, wherein said plate portion has a clip protruding from a bottom side thereof for aiding in manipulating the floor board to pivot from the vertical position to the generally horizontal position.

13. The floor board of claim 11 wherein the floor board has a skid member on a lower side thereof adjacent an outer edge thereof.

14. The floor board of claim 11, wherein the floor board has detents for detenting the floor board in its vertical position and in its generally horizontal position.

15. The floor board of claim 11, wherein said floor board and the support bracket have engaging stop surfaces to stop downward movement when the floor board reaches the horizontal position.

16. The floor board of claim 11 wherein said floor board is mountable on a motorcycle in position substantially aligned in a vertical direction with a lower leg of a driver seated on the seat of the motorcycle.

17. A floor board for a driver of a motorcycle, the floor board comprising a support bracket for mounting the floor board on the side of the motorcycle, a pivotal mounting between a generally horizontal portion of the support bracket and the floor board, wherein the floor board pivots from a generally horizontal position to a position that is between 80 and 90 degrees upwardly relative to a horizontal plane to minimize the spacing between upper edge of the floor board when in a retracted position to permit a driver's legs to be positioned close to sides of a stationary motorcycle, wherein the support bracket includes a flange that attaches to a motorcycle frame, and an outwardly extending offset section for clearance for a foot operated control, and the horizontal portion of the support bracket comprising a support flange for forming a pivot support for the floor board, and wherein the bracket offset section is of size to provide clearance for the foot operated control positioned between the floor board and the motorcycle frame, and on an upper side of the offset portion of the bracket.

* * * * *